(12) United States Patent
Tang

(10) Patent No.: US 7,988,112 B2
(45) Date of Patent: Aug. 2, 2011

(54) MULTI-SCREEN DISPLAY DEVICE

(75) Inventor: Weng-Tiang Tang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 335 days.

(21) Appl. No.: 12/199,541

(22) Filed: Aug. 27, 2008

(65) Prior Publication Data
US 2010/0011646 A1 Jan. 21, 2010

(30) Foreign Application Priority Data
Jul. 18, 2008 (CN) .................... 2008 2 0301546 U

(51) Int. Cl.
*E04G 3/00* (2006.01)
*A47F 5/00* (2006.01)
*A47G 1/06* (2006.01)
*G09F 7/00* (2006.01)
*G09F 15/00* (2006.01)
*G09F 15/02* (2006.01)

(52) U.S. Cl. .................. 248/274.1; 248/248; 248/121; 248/200; 248/289.11; 248/291.1; 40/725; 40/729; 40/733; 40/605; 40/606.16; 40/730; 361/679.02

(58) Field of Classification Search ............ 248/121, 248/200, 274.1, 228.11, 309.1, 289.11, 291.1, 248/296.1, 917, 919, 277.1, 276.1, 459, 447, 248/479, 441.1; 40/725, 729, 733, 605, 606.16, 40/730; 361/679.02, 349.04, 379.06, 679.07, 361/679.21, 679.22, 679.23, 681
See application file for complete search history.

(56) References Cited

U.S. PATENT DOCUMENTS

| | | | | |
|---|---|---|---|---|
| 905,951 A * | 12/1908 | Sturla | ............................. | 40/658 |
| 2,317,708 A * | 4/1943 | Zareko | ............................ | 40/733 |
| 4,562,656 A * | 1/1986 | Kristofich | ...................... | 40/733 |
| 4,785,565 A * | 11/1988 | Kuffner | .......................... | 40/605 |
| 5,887,373 A * | 3/1999 | Byers | ................................ | 40/733 |
| 5,974,713 A * | 11/1999 | Wu | ................................... | 40/733 |
| 6,230,428 B1 * | 5/2001 | Albin | ............................... | 40/730 |
| 6,347,467 B1 * | 2/2002 | Meyer | ........................ | 40/124.06 |
| 7,242,588 B2 * | 7/2007 | Kitsopoulos | .................. | 361/729 |
| 2003/0179541 A1 * | 9/2003 | Sullivan | ......................... | 361/681 |
| 2009/0100732 A1 * | 4/2009 | Seidler | ............................ | 40/729 |

* cited by examiner

Primary Examiner — Terrell McKinnon
Assistant Examiner — Christopher Garft
(74) Attorney, Agent, or Firm — Clifford O. Chi

(57) ABSTRACT

A multi-screen display device includes a display device and a folding bracket. The display device includes a first display frame and a second display frame. The folding bracket includes an inner rotating portion pivotally connected to the first display frame, and an outer rotating portion pivotally connected to the inner rotating portion and pivotally connected to the second display frame.

17 Claims, 5 Drawing Sheets

MULTI-SCREEN DISPLAY DEVICE

BACKGROUND

1. Field of the Invention

The present invention relates to display devices, and more particularly, to a multi-screen display device.

2. Description of Related Art

A typical digital photo frame is capable of storing several photos and changing the displayed photo. A digital photo taken by a digital camera may be stored in the memory of the digital photo frame and displayed without printing the photo. A user may arbitrarily change the displayed photo, which cannot be accomplished by a conventional photo frame.

The typical digital photo frame has only one display screen for displaying the photos, and is usually placed on a table for the user to enjoy the photos. However, the typical digital photo frame limits the user to view the photos in one general direction, and does not allow the user to arbitrarily change its shape.

What is needed, therefore, is a multi-screen display device, to overcome the above described-shortcomings.

DETAILED DESCRIPTION OF THE EMBODIMENTS

Figure 1:
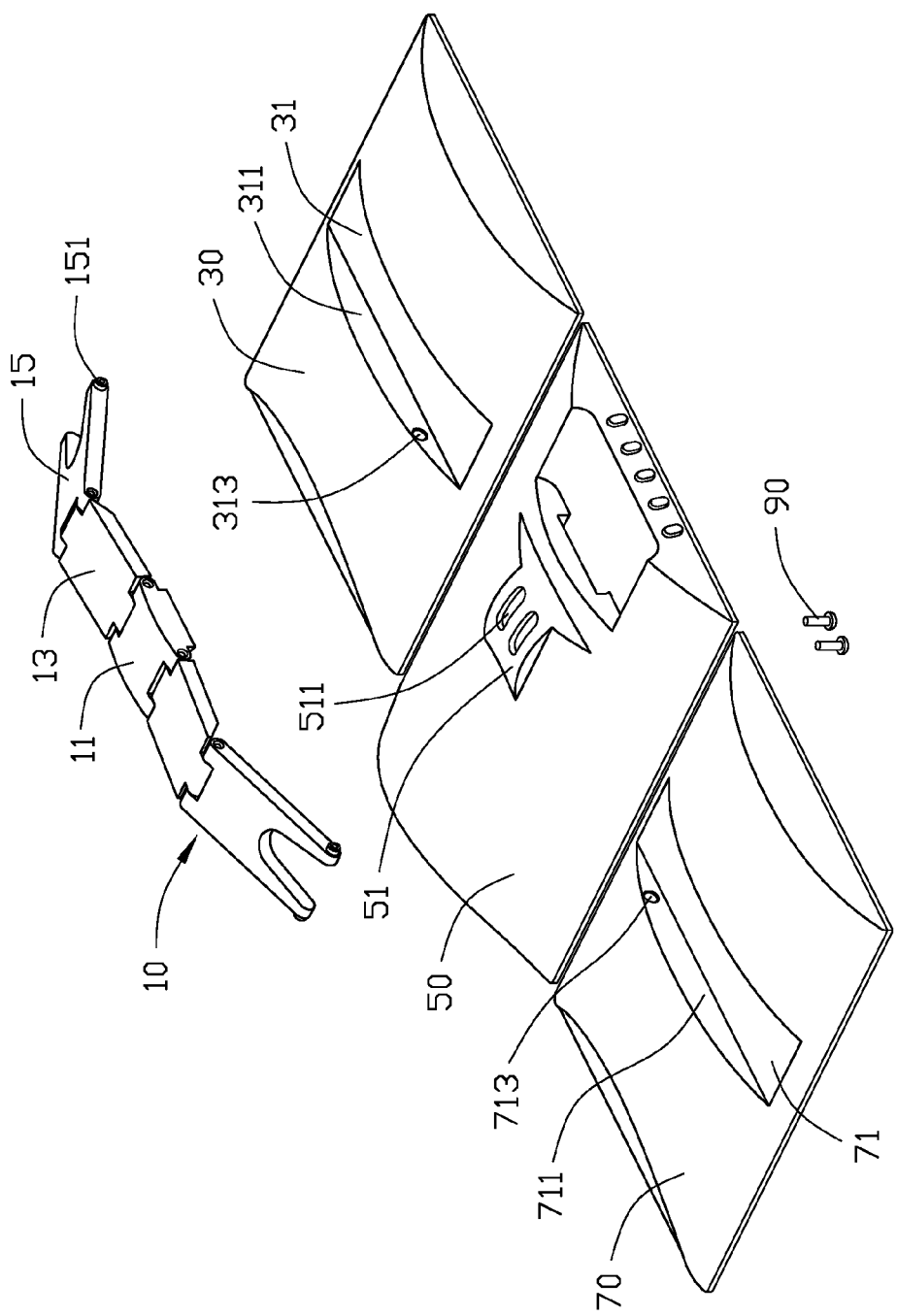
FIG. 1 is an exploded, isometric view of an embodiment of a multi-screen display device, the multi-screen display device including a folding bracket, and a display device having a first display frame, a second display frame, and a third display frame.
Figure 2:
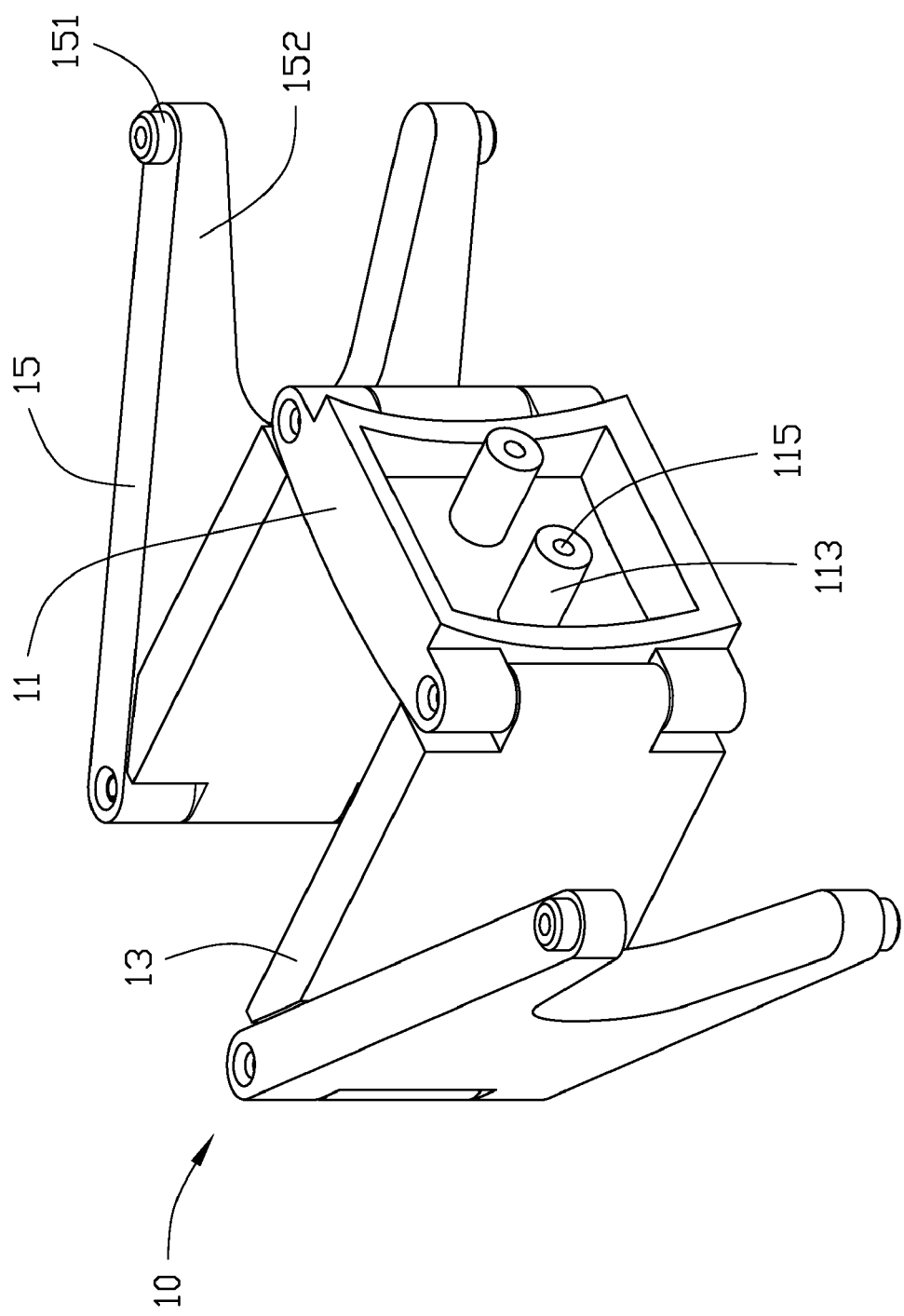
FIG. 2 is an isometric view of the folding bracket of FIG. 1, shown in a folding state.

Referring to FIGS. 1 and 2, an embodiment of a multi-screen display device includes a folding bracket 10 and a display device (not labeled). In the illustrated embodiment, the display device is a digital photo frame. In one embodiment, the digital photo frame includes a first display frame 50 and a second display frame 30. In the illustrated embodiment, the digital photo frame further includes a third display frame 70. The second display frame 30 and the third display frame 70 are located on opposite sides of the first display frame 50. Each of the display frames 30, 50, 70 has a rectangular display surface on a front side and an opposite back side having a curved surface.

The first display frame 50 includes a mounting block 51 protruding from a center portion of the back side of the first display frame 50. Two retaining slots 511 are defined in the mounting block 51. A groove 31 is defined in the back side of the second display frame 30. The groove 31 has two parallel arcuate surfaces 311. A pivot hole 313 is defined on each of the two arcuate surfaces 311 adjacent to the first display frame 50. A groove 71 is defined in the back side of the third display frame 70, and the groove 71 has two parallel arcuate surfaces 711. A pivot hole 713 is defined on each of the two arcuate surfaces 711 adjacent to the first display frame 50. The second display frame 30 and the third display frame 70 are symmetrically opposite to each other.

The folding bracket 10 includes a locating base 11, and two bending arms (not labeled). In the illustrated embodiment, two posts 113 protrude from a bottom surface of the locating base 11. The two posts are configured for extending through the two corresponding retaining slots 511. A fixing hole 115 is defined in the center of each post 113 for attaching the folding bracket 10 to the first display frame 50 via fasteners 90. Each of the two bending arms includes an inner rotating portion 13 pivotally connected to two opposite edges of the locating base 11 and an outer rotating portion 15 pivotally connected to an edge of the inner rotating portion 13. Each outer rotating portion 15 includes two pivot arms 152. Two pivots 151 protrude from free ends of the two pivot arms 152 of each outer rotating portion 15 corresponding to the two pivot holes 313, 713. The two pivot arms 152 of each outer rotating portion 15 form a U shape. The inner rotating portions 13 and the outer rotating portions 15 are capable of rotating, thereby forming alternating angles between the inner rotating portions 13 and the locating base 11, and angles between the inner rotating portions 13 and the outer rotating portions 15. The width of the bending arm is substantially the same as a width of the grooves 31, 71. The pivots 151 are pivotably attached to the corresponding pivot holes 313, 713, and two ends of each outer rotating portion abut against the arcuate surfaces 311, 711.

Figure 3:
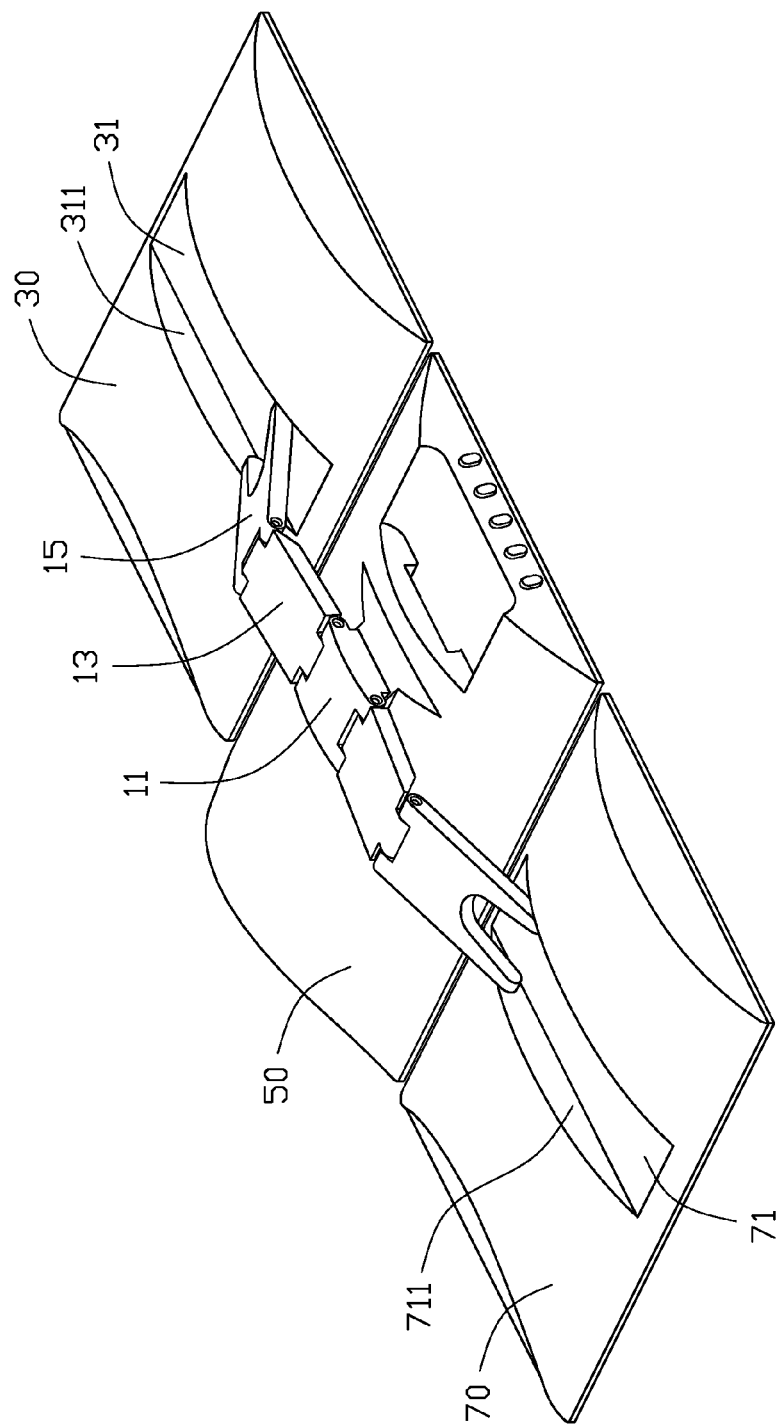
FIG. 3 is an assembled isometric view of the multi-screen display device of FIG. 1.

Referring to FIG. 3, the folding bracket 10 is pushed towards the mounting block 51, the posts 113 extend through the corresponding retaining slot 511, and the outer rotating portions 15 of the folding bracket 10 are located in the grooves 31, 71. Two fasteners 90 are inserted through the two retaining slots 511 and into the fixing holes 115, thereby fixing the folding bracket 10 to the digital photo frame, and connecting the three display frames together via the folding bracket 10. The digital photo frame may be placed on a table so that photos in the digital photo frame can be viewed through the three display frames.

Figure 4:
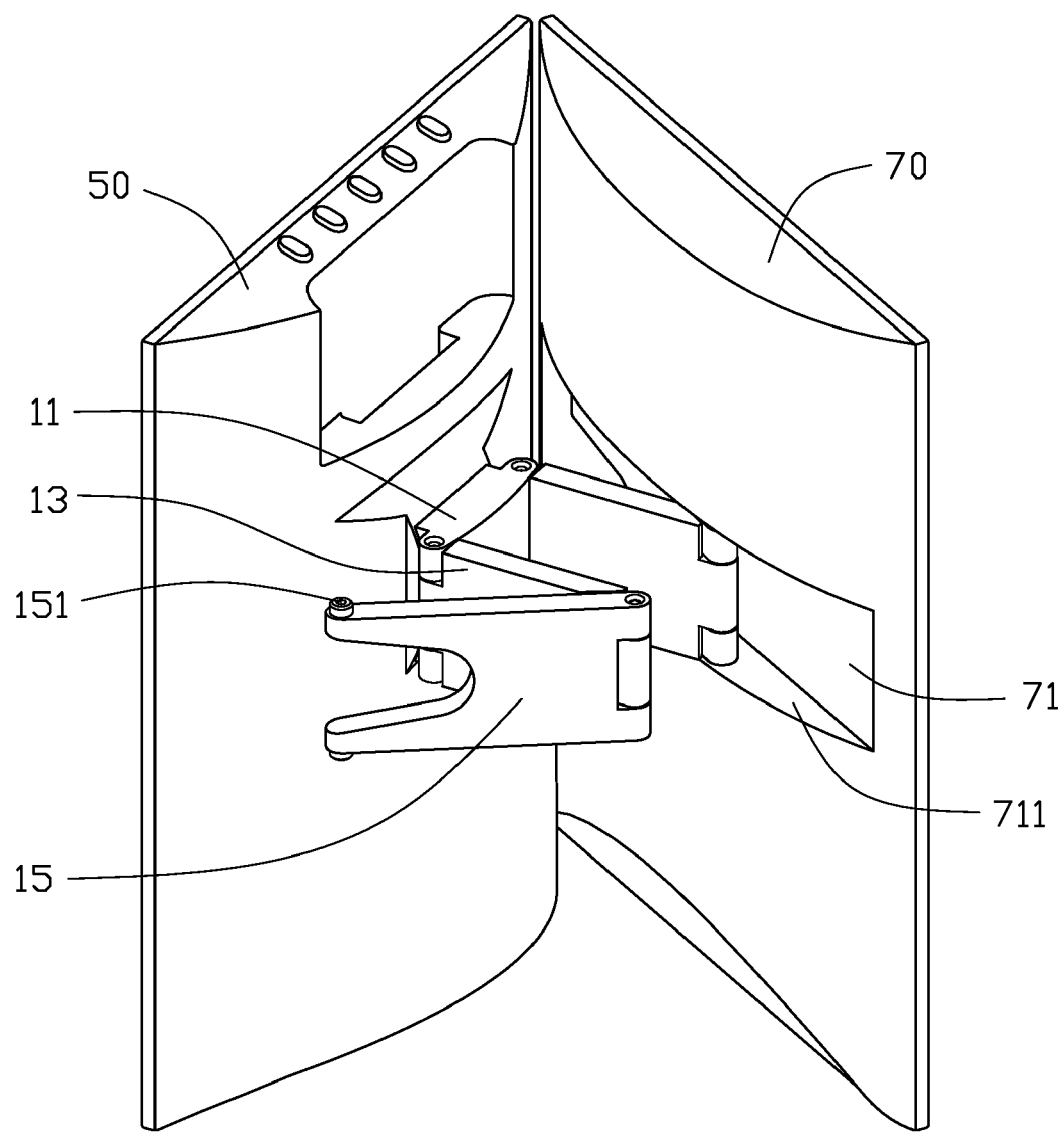
FIG. 4 is an assembled isometric view of the multi-screen display device of FIG. 1, shown in the folding state, but without showing the second display frame.
Figure 5:
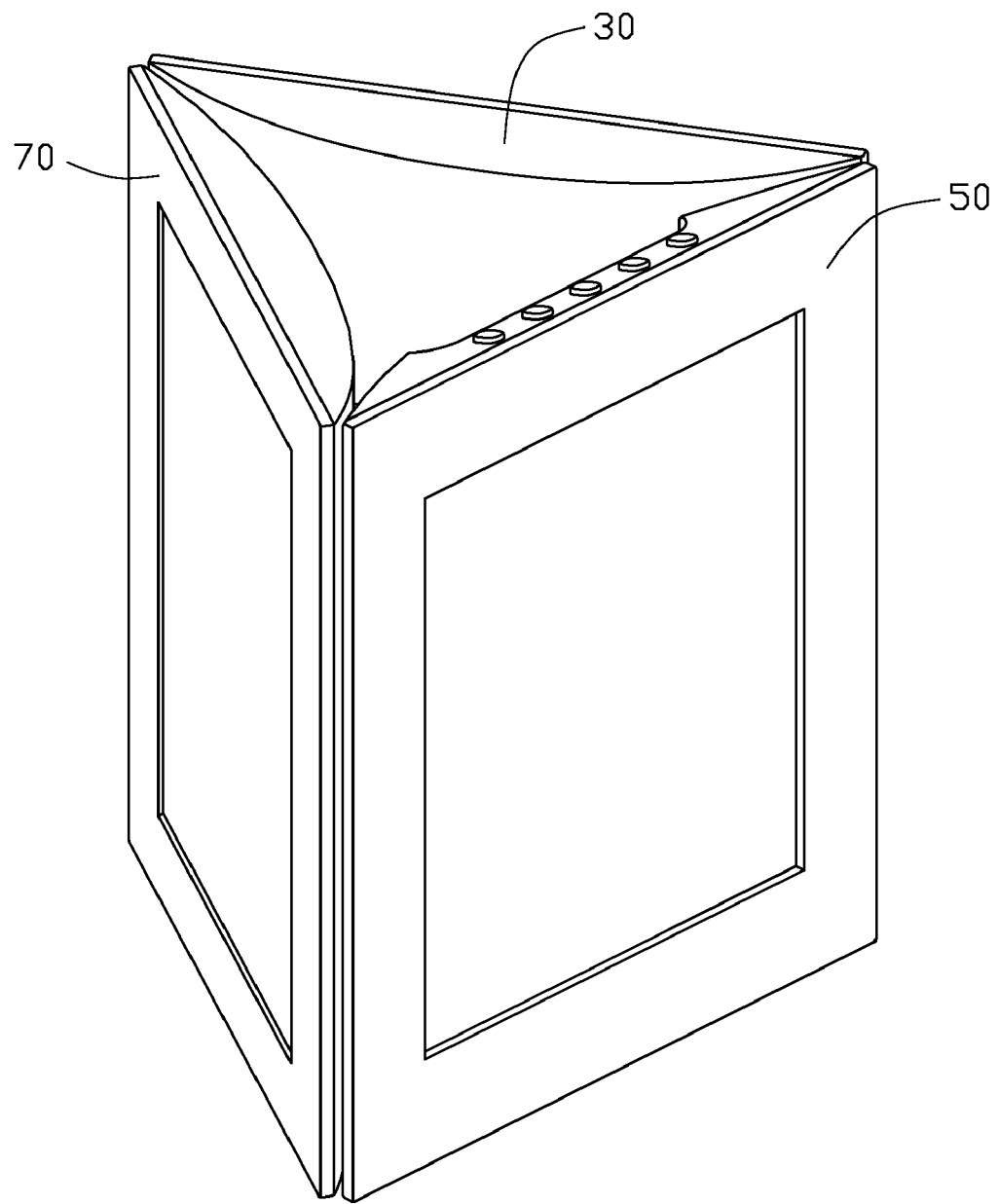
FIG. 5 is an assembled isometric view of the multi-screen display device of FIG. 1, shown in the folding state.

Referring to FIGS. 4 and 5, the digital photo frame may have different display configurations. In one example, the second display frame 30 and the third display frame 70 are pushed towards the back side of the first display frame 70, and the second display frame 30 rotates about a bottom surface of the second display frame 30 and the third display frame 70 rotates at a bottom surface of the third display frame 70. At the same time, the inner rotating portions 13 and the outer rotating portions 15 rotate relative to the locating base 11. When the second display frame 30 and the third display frame 70 rotate to contact each other, the digital photo frame forms a triangle, and the folding bracket 10 substantially forms an M shape. In this display configuration, the photos can be viewed from several different directions, thereby providing more added functions for users and increasing the practicality and value of the digital photo frame.

The folding bracket 10 of the multi-screen display device can also be used in other devices having a folding structure.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the embodiments to the full extent indicated by the broad general meaning of the terms in which the appended claims are expressed.

What is claimed is:

1. A multi-screen display device, comprising:
 a display device comprising a first display frame and a second display frame;
 a folding bracket comprising a first inner rotating portion pivotally connected to the first display frame, and a first outer rotating portion pivotally connected to the first inner rotating portion and pivotally connected to the second display frame;
 wherein the folding bracket further comprises a locating base mounted to the first display frame; the first inner rotating portion is pivotally connected to an edge of the locating base;
 the display device further comprises a third display frame; the folding bracket further comprises:
 a second inner rotating portion pivotally connected to the first display frame via another edge of the locating base; and
 a second outer rotating portion pivotally connected to the second inner rotating portion, and pivotally connected to the third display frame;
 at least one pivot hole is defined in the second display frame; at least one pivot hole is defined in the third display frame; a groove is defined in the second display frame; a groove is defined in the third display frame; each groove has two parallel arcuate surfaces; the at least one pivot hole of the second display frame and the at least one pivot hole of the third display frame are symmetrically defined in the two parallel arcuate surfaces of each groove; each outer rotating portion forms two pivots for inserting into the pivot holes of the corresponding display frame.

2. The multi-screen display device of claim 1, wherein a width of the folding bracket is substantially the same as a width of the grooves, so that two opposite side ends of each outer rotating portion is capable of abutting on the two arcuate surfaces of the corresponding groove.

3. The multi-screen display device of claim 1, wherein the second display frame and the third display frame are capable of rotating, thereby alternating the angles between each inner rotating portion and the locating base, and the angles between each inner rotating portion and each corresponding outer rotating portion.

4. The multi-screen display device of claim 3, wherein the second display frame rotates about a back surface of the second display frame and the third display frame rotates at a back surface of the third display frame.

5. The multi-screen display device of claim 1, wherein the second display frame and the third display frame are configured to rotate such that the display device forms a triangle, and the folding bracket substantially forms an M shape.

6. The multi-screen display device of claim 1, wherein at least one post protrudes from a bottom surface of the locating base; at least one retaining slot is defined in the first display frame for the at least one post extending through; a fastener extends through the retaining slot and into a fixing hole of the at least one post for mounting the locating base to the first display frame.

7. A multi-screen display device, comprising:
 a first display frame;
 a second display frame;
 a third display frame; and
 a folding bracket comprising a locating base mounted to the first display frame, and two bending arms, wherein a first bending arm is pivotally connected to a first side of the locating base and pivotally connected to the second display frame; a second bending arm is pivotally connected to a second opposite side of the locating base and pivotally connected to the third display frame;
 wherein each bending arm comprises two pivot arms pivotally connected to the corresponding display frame, and the two pivot arms of each bending arm forms a U shape; and each bending arm comprises an inner rotating portion pivotally connected to the locating base and an outer rotating portion pivotally connected to the inner rotating portion, and each outer rotating portion comprises the two pivot arms.

8. The multi-screen display device of claim 7, wherein a groove having two parallel arcuate surfaces is defined in the second display frame; a groove having two parallel arcuate surfaces is defined in the third display frame; at least one pivot hole is defined in the second display frame; at least one pivot hole is defined in the third display frame; the at least one pivot hole of the second display frame and the at least one pivot hole of the third display frame are symmetrically defined in the two parallel arcuate surfaces of each groove; each pivot arm forms a pivot for inserting into the pivot holes of the corresponding display frame.

9. The multi-screen display device of claim 7, wherein the second display frame rotates about a back surface of the second display frame and the third display frame rotates at a back surface of the third display frame thereby alternating the angles between each inner rotating portion and the locating base, and the angles between each inner rotating portion and each corresponding outer rotating portion.

10. The multi-screen display device of claim 7, wherein the second display frame and the third display frame are configured to rotate such that the three display frames form a triangle, and the folding bracket substantially forms an M shape.

11. The multi-screen display device of claim 7, wherein at least one post protrudes from a bottom surface of the locating base; at least one retaining slot is defined in the first display frame corresponding to the at least one post; a fastener extends through the retaining slot and into a fixing hole of the at least one post for mounting the locating base to the first display frame.

12. A multi-screen display device, comprising:
 a display device comprising a first display frame and a second display frame; a groove having two parallel surfaces defined in the second display frame; a pivot hole is defined in one of the two parallel surfaces; and
 a folding bracket comprising a first inner rotating portion, that is pivotally connected to the first display frame, and a first outer rotating portion, that is pivotally connected to the first inner rotating portion and pivotally connected to the second display frame; and the outer rotating portion comprises a pivot configured to insert into the pivot hole.

13. The multi-screen display device of claim 12, wherein a width of the folding bracket is substantially the same as a width of the grooves, so that two opposite side ends of the first outer rotating portion abut on the two surfaces of the groove.

14. The multi-screen display device of claim 12, wherein the display device further comprises a third display frame; the folding bracket further comprises:
 a second inner rotating portion pivotally connected to the first display frame via a second edge of the locating base; and a second outer rotating portion pivotally connected to the second inner rotating portion and the third display frame.

15. The multi-screen display device of claim 14, wherein when the multi-screen is in a folded status, the first display frame contacts the second display frame and the third display frame, and the second display frame contacts the third display frame.

16. The multi-screen display device of claim 14, wherein the second display frame and the third display frame are configured to rotate such that the three display frames can form a triangle.

17. The multi-screen display device of claim 13, wherein each surface is arcuate.

* * * * *